Patented Oct. 6, 1931

1,825,965

UNITED STATES PATENT OFFICE

PETER A. LANG, OF CARTERET, NEW JERSEY, ASSIGNOR TO BOWKER CHEMICAL COMPANY, OF NEW YORK, N. Y., A CORPORATION OF NEW JERSEY

PRODUCTION OF DISODIUM PHOSPHATE

No Drawing.  Application filed July 14, 1928. Serial No. 292,916.

My invention relates to an improved process for the production of crystalline disodium phosphate ($Na_2HPO_4.12H_2O$) and has for its object the production of crystals of such purity that no substantial turbidity is shown when the material is dissolved in distilled water.

Disodium phosphate is prepared by neutralizing dilute phosphoric acid (about 23° Bé) to slight alkalinity with sodium carbonate. Mother liquor from previous crystallizations of disodium phosphate may also be added. As the result of the reaction, various impurities including compounds of iron, aluminum, calcium, etc. are precipitated and may be removed by filtration.

In the past it has been the custom to concentrate the solution thus obtained to a point at which crystalline disodium phosphate will form as the solution is cooled. In practise it is customary to evaporate the liquid to a concentration of about 32° Bé, though a lesser concentration may be used if desired. As the result of the concentration of the liquor, additional impurities are thrown out of solution and are removed by filtration, after which the crystallization is effected by cooling. Crystals produced by the prior art process described cannot be dissolved in distilled water to produce a clear solution. The turbidity of such solutions appears to be due to impurities which remain in solution in the dilute liquor during the filtration operation and which subsequently contaminate the crystals formed.

I have now invented a process for the manufacture of disodium phosphate, whereby a crystalline material capable of producing a clear solution in distilled water may be obtained.

This process is based on my discovery that substantially all of the impurities mentioned are thrown out of solution if the concentration is increased to about 40–42° Bé. Such a solution is too concentrated for efficient use in the subsequent filtering and crystallizing operations but I have further discovered that I may subsequently dilute said concentrated solution to any desired degree without causing the resolution of the precipitated impurities.

In practising my process I therefore concentrate the disodium phosphate solution produced as hereinbefore described to about 40–42° Bé. I may effect this concentration at atmospheric pressure or at a diminished pressure. In case diminished pressure is employed, the solution is preferably raised to its boiling point at atmospheric pressure before subsequent treatment. The concentration of the solution to 40–42° Bé results in the precipitation of the impurities. I then dilute the product to produce a solution of desirable concentration for filtration and crystallization. I prefer to dilute the solution to about 32° Bé after which I filter it and permit crystallization to occur in accordance with the usual prior art methods. It is not essential that the solution used for filtration and crystallization be diluted to 32° Bé. The liquid may be diluted to any desired degree that will permit ready filtration and will at the same time be sufficiently concentrated to permit use in the crystallization operation.

I claim:—

1. A process for the production of pure crystals of disodium phosphate, which comprises neutralizing a dilute solution of phosphoric acid with a basic sodium solution, concentrating the resulting solution to 40 to 42° Bé, and heating it to about its boiling point at normal pressures, diluting the solution to a suitable concentration for filtering and crystallization, filtering the diluted solution and permitting crystallization to take place.

2. A process for the production of pure crystals of disodium phosphate which comprises neutralizing a dilute solution of phosphoric acid with sodium carbonate, evaporating the neutralized solution under diminished pressure to about 42° Bé, heating the evaporated solution to its boiling point under atmospheric pressure, diluting the solution, filtering it and permitting crystallization to occur.

3. A process for the production of pure crystalline disodium phosphate which comprises evaporating a solution thereof to 40–42° Bé, diluting said solution to about 32° Bé, filtering said solution, and permitting crystallization to occur.

In testimony whereof, I have signed my name to this specification this 10th day of July 1928.

PETER A. LANG.